United States Patent [19]

Bokalot

[11] Patent Number: 4,715,562
[45] Date of Patent: Dec. 29, 1987

[54] MECHANISM FOR AUTOMATICALLY ACTUATING A RESCUE DEVICE UPON OPENING OF AN EXIT DOOR

[75] Inventor: Jean Bokalot, Toulouse, France

[73] Assignee: Societe Nationale Industrielle Aerospatiale, Paris, France

[21] Appl. No.: 821,259

[22] Filed: Jan. 22, 1986

[30] Foreign Application Priority Data

Jan. 24, 1985 [FR] France .................. 85 01012

[51] Int. Cl.$^4$ .................................... B64C 1/34
[52] U.S. Cl. ............................ 244/137.2; 244/905
[58] Field of Search ......... 244/137 P, 137 R, DIG. 2, 244/129.4, 129.6; 193/25 B; 182/48; 24/609

[56] References Cited

U.S. PATENT DOCUMENTS

| | | | |
|---|---|---|---|
| 3,633,853 | 1/1972 | Collins | 182/48 |
| 3,634,914 | 1/1972 | Schroedter | 244/137 P |
| 3,852,854 | 12/1974 | Sigrud et al. | 244/137 P |
| 4,014,486 | 3/1977 | Nelson et al. | 244/137 P |
| 4,106,729 | 8/1978 | Bergman et al. | 244/137 P |
| 4,375,877 | 3/1983 | Shorey | 193/25 B |

FOREIGN PATENT DOCUMENTS 2029167 12/1971 Fed. Rep. of Germany ... 244/DIG. 2

*Primary Examiner*—Jeffrey V. Nase
*Assistant Examiner*—Lynn M. Fiorito
*Attorney, Agent, or Firm*—Fisher, Christen & Sabol

[57] ABSTRACT

This invention relates to a mechanism for automatically actuating a rescue device upon opening of a panel obturating an exit and bearing said rescue device, mechanism comprising a control bar connected to said rescue device and adapted, under the action of a voluntary actuating member, to be rendered fast either with said panel or with the periphery of said exit, with the result that opening of said panel does not bring about, or brings about, respectively, actuation of said rescue device via said control bar. According to the invention, this mechanism is characterized in that said control bar is fast in displacement with a mobile system controlled by said voluntary actuating member in order to subject said bar to a movement of translation parallel to itself, of direction at least substantially at right angles to said panel. The invention is more particularly applicable to the automatic control of escape slides, slide/rafts or the like in the event of an emergency.

6 Claims, 11 Drawing Figures

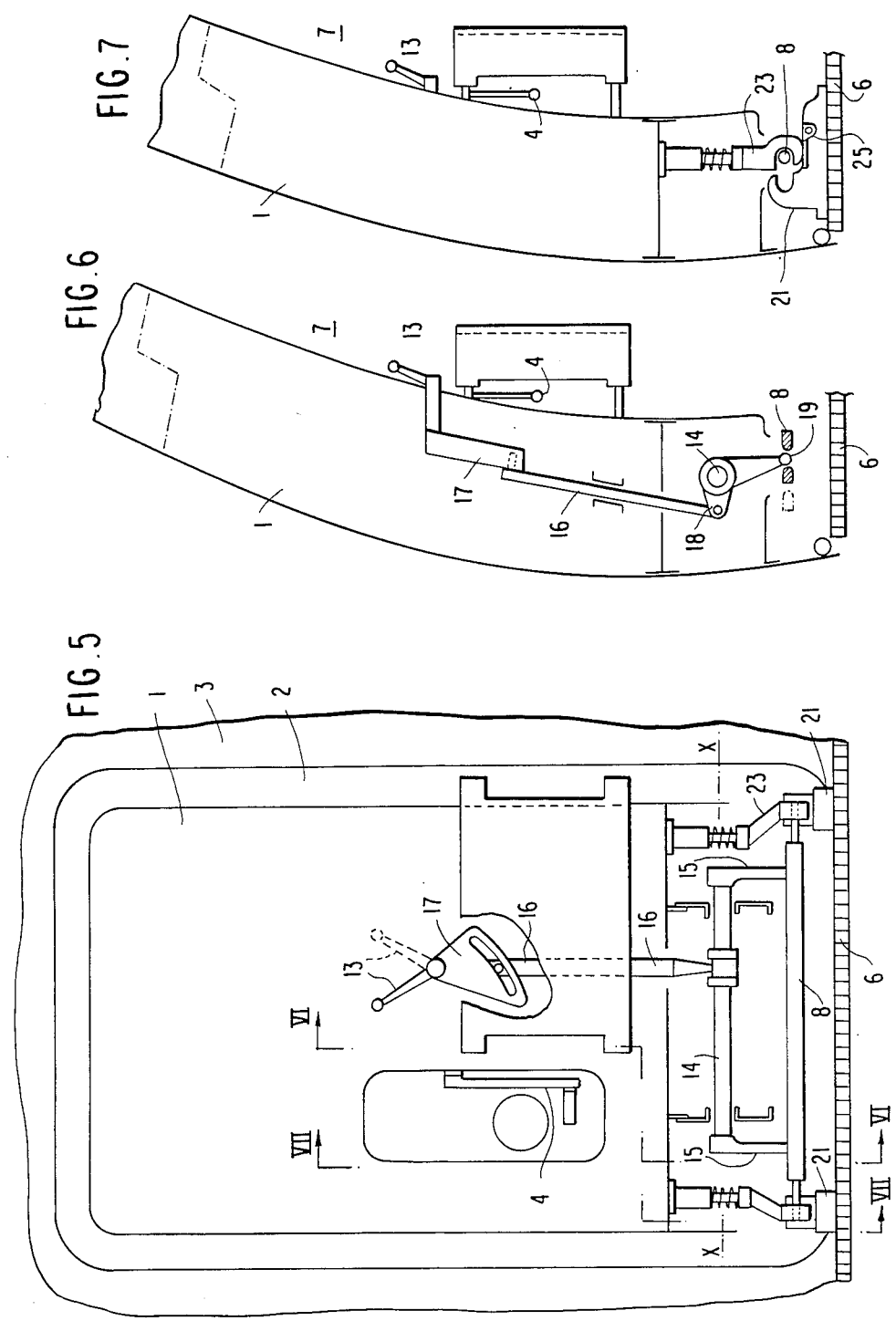

MECHANISM FOR AUTOMATICALLY ACTUATING A RESCUE DEVICE UPON OPENING OF AN EXIT DOOR

The present invention relates to a mechanism for automatically actuating a rescue device upon opening of an exit door. Although not exclusively, it is particularly appropriate for use on board aircraft, in the event of emergency landing or ditching.

It is known that, on board aircraft, at least certain of the doors comprise, on their interior face, a rescue device, for example an escape slide or combined slide/raft, enclosed in a container fast with said door. This rescue device is connected to a control bar which, under the action of a handle borne by the door, may be rendered fast with said door or with the threshold thereof, as desired. Thus, when said handle is in its position for which the bar is rendered fast with said door, the rescue device and said bar rotate with the latter, with the result that the rescue device is not actuated when the door is rotated. On the other hand, when said handle is in its position for which the bar is rendered fast with the threshold of said door, the fact of the latter opening causes a relative movement of the rescue device with respect to the bar and this relative movement acts, via the connection provided to this end, on the rescue device which is unfurled from said container.

In known mechanisms, for each end of the control bar, there is provided a slider mounted in a slide fast with the lower part of the door and adapted to slide with respect to said bar. Moreover, opposite each slider, there is disposed a shoe fast with the threshold of the door. A mechanism based on connecting rods and levers is disposed between the control handle and said sliders.

Thus, for one position of said control handle, said sliders may connect the bar with the door via said sliders and slides, whereas for another position, said handle imposes connection of the bar and the threshold of the door via said sliders and shoes. Of course, in the first position mentioned, the sliders are disengaged from the shoes, whilst, in the second, they are disengaged from the slides.

These known devices present the drawback that said mechanisms are complicated and comprise a large number of parts. It is an object of the present invention to overcome this drawback by reducing the number of parts indispensable, and by simplifying said mechanisms, whilst eliminating the mechanical problems created by mobile sliders.

To this end, according to the invention, the mechanism for automatically actuating a rescue device upon opening of a panel obturating an exit and bearing said rescue device, mechanism comprising a control bar connected to said rescue device and adapted, under the action of a voluntary actuating member, to be rendered fast either with said panel or with the periphery of said exit, with the result that opening of said pool does not bring about, or brings about, respectively, actuation of said rescue device via said control bar, is noteworthy in that said control bar is fast in displacement with a mobile system controlled by said voluntary actuating member in order to subject said bar to a movement of translation parallel to itself, of direction at least substantially at right angles to said panel.

In this way, thanks to the present invention, said sliders and the mechanical complications that they involve may be eliminated, since, for one of its end positions, said control bar may be arranged to be fast with said panel, whilst, for the other, it is fast with the frame surrounding same.

In its end position directed towards said panel, said control bar is preferably fast with the periphery of said exit, whilst, in its other end position, said control bar is fast with said panel.

In an advantageous embodiment, said mobile system comprises a shaft, for example parallel to the floor of the aircraft and disposed in the vicinity of said floor, this shaft being mounted on said panel in order to be able to rotate about its own longitudinal axis and being provided with radial tabs adapted to push or draw said control bar in one direction and in the other. Furthermore, in order to connect said control bar with the periphery of said exit, for example its threshold when it is a door, shoes may be provided, fast with the frame of said exit and each provided with a housing for hooking, open opposite said control bar.

In the case, usual for aircraft doors, of the panel which obturates said exit undergoing a movement of rotation or of lifting or of lifting combined with a rotation at the moment of opening, it is advantageous if said radial tabs provided to push or draw said control bar be disposed above the latter and may penetrate by their ends in notches provided in said control bar, and may freely disengage therefrom.

Between the mobile system and the control bar, a free connection is thus obtained which may either be eliminated by lifting the panel, or established by lowering same.

It is then preferable, in order to ensure connection of the control bar on said panel, to provide, in addition, fork elements fast with the latter and capable of receiving said control bar, when the latter is in its position for which it is fast with said panel. The control bar is thus, in this position, maintained between said fork elements and said tabs.

In order to avoid accidental unhooking of the control bar from its hooking shoes when it is fast with the frame of the exit, bolts are provided which prevent said control bar from leaving said hooking housings when it has penetrated therein and the panel is open.

However, in order to allow the introduction of said control bar into the hooking housings of the shoes when the panel is closed, it is advantageous, when the panel is in closed position, if said fork elements act on these bolts to retract them and totally release said hooking housings of the shoes.

In order to fulfill this function better, particularly when said bolts comprise a blade pushed elastically to obturate such a housing, said fork elements are elastically telescopic in order to be able to press said blades and push them against the action of the elastic means tending to cause them to project.

Furthermore, said locks may advantageously be provided with additional members for voluntary control of unlocking. Said shoes may be used for hooking the bar, similar to said control bar, of a rescue device or another device whose automatic deployment is not provided in concomitance with the opening of said panel. Such a device may for example be a liferaft, independent of the rescue device enclosed in the container inside said panel.

The invention will be more readily understood on reading the following description with reference to the accompanying drawings, in which:

FIG. 5 is a schematic front view, from inside the aircraft, of an exit door for passengers, equipped with an automatic rescue device according to the invention.

FIGS. 6 and 7 are schematic, partial views in section, along lines VI—VI and VII—VII respectively of FIG. 5.

Figure 8:
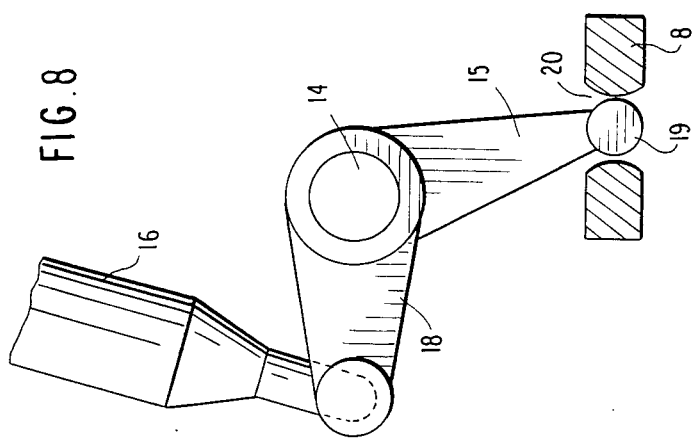

FIG. 8 schematically illustrates in side view, on a larger scale, part of the mechanism for actuation in translation of the control bar.

Figure 9:
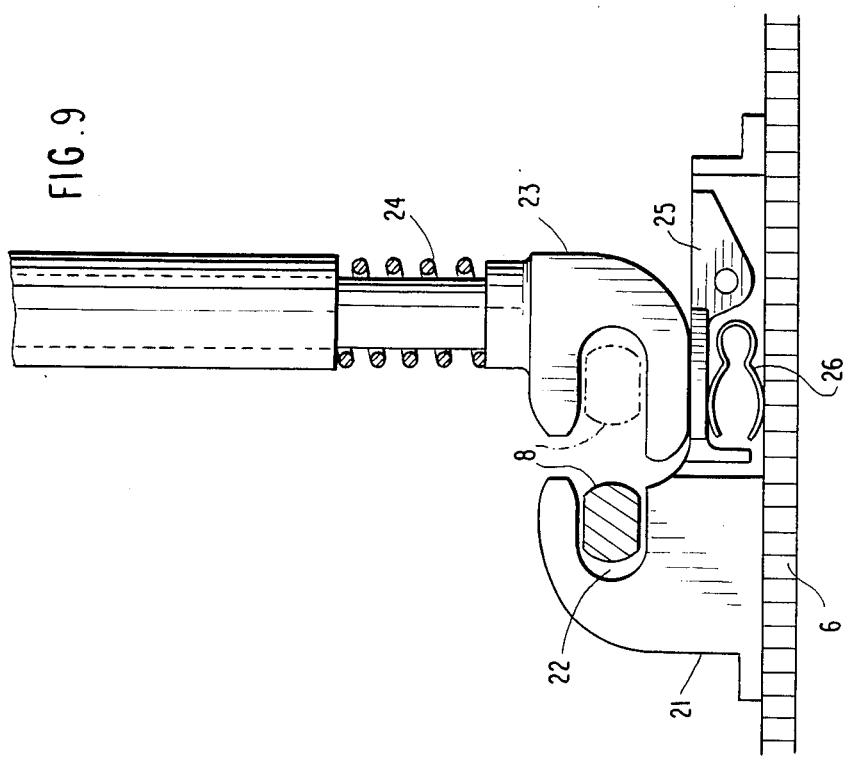

FIG. 9 schematically illustrates, in side view, on a larger scale, part of the mechanism for hooking said bar on the threshold of the exit door.

Figure 10:
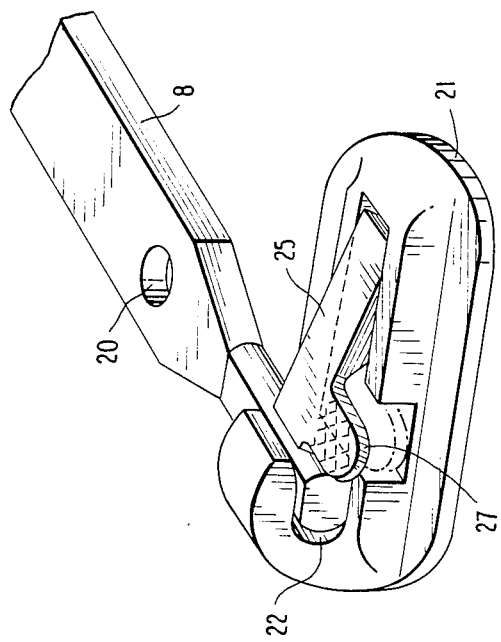

FIG. 10 is a schematic view in perspective showing one end of said control bar, locked in a hooking shoe.

Figure 11:
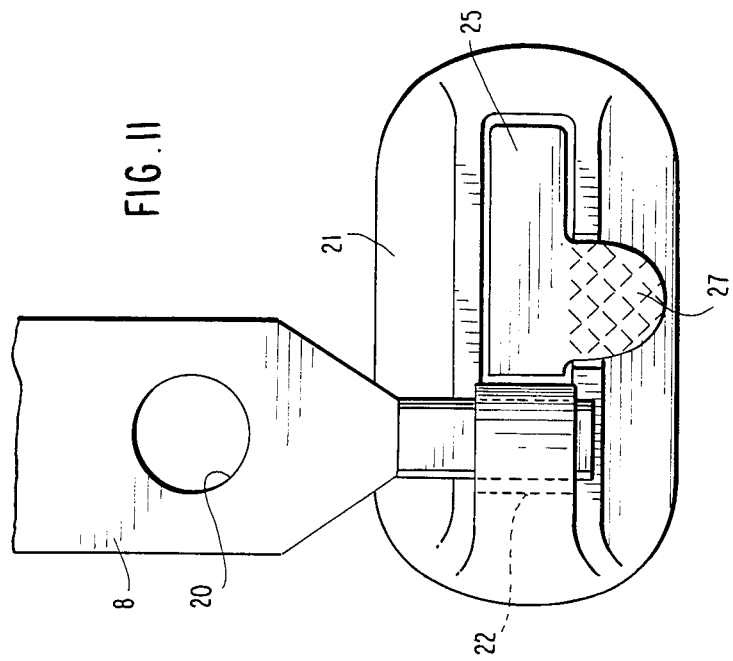

FIG. 11 is a schematic plan view corresponding to FIG. 10.

Referring now to the drawings, FIGS. 1 to 4 schematically illustrate an exit door of an aircraft, equipped with a rescue device and a mechanism for actuating same in accordance with the prior art.

Figure 2:
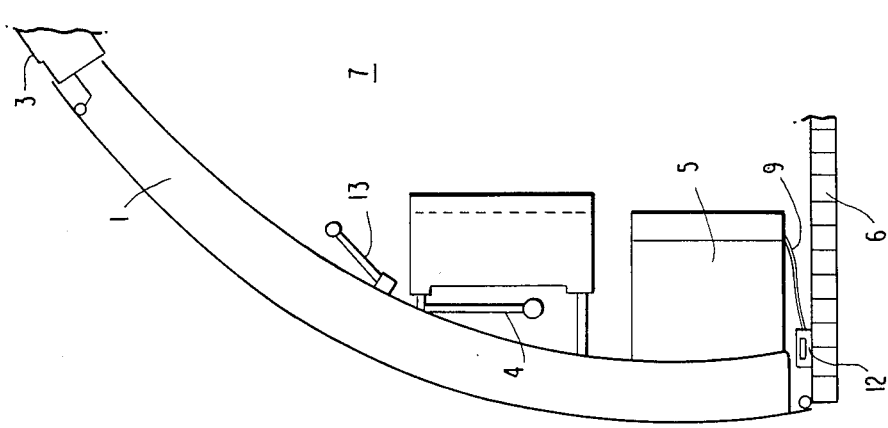
FIG. 2 is a schematic side view corresponding to FIG. 1.
Figure 1:
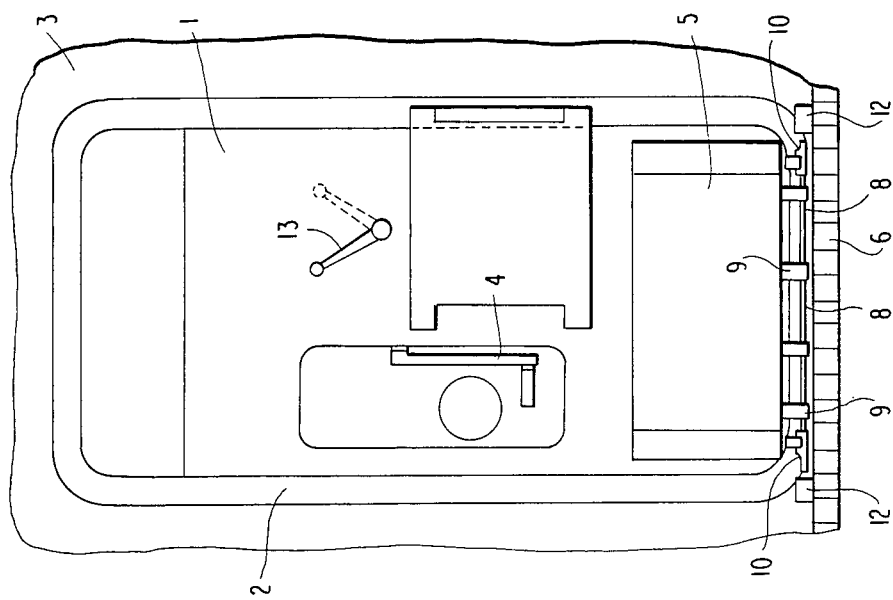
FIG. 1 is a schematic front view showing, from inside an aircraft, an exit door for passengers, equipped in known manner with an automatic rescue device.

As may be seen in FIGS. 1 and 2, door 1 is mounted in a frame 2 provided in the fuselage 3 of an aircraft. This door 1 is equipped with an opening and locking handle 4 and it comprises a container 5 in which is enclosed a folded rescue device such as an escape slide, combined slide/raft or the like.

In the lower part of the door 1, in the vicinity of the floor 6 of the passengers' cabin 7, there is provided a bar 8, rendered fast with the rescue device contained in the container 5 via tabs or laces 9 and possibly intended to be hooked to the threshold of said door 1.

Figure 4:
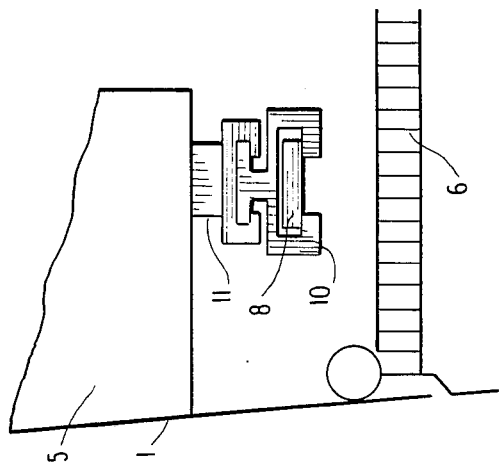
FIG. 4 is a schematic side view corresponding to FIG. 3.
Figure 3:
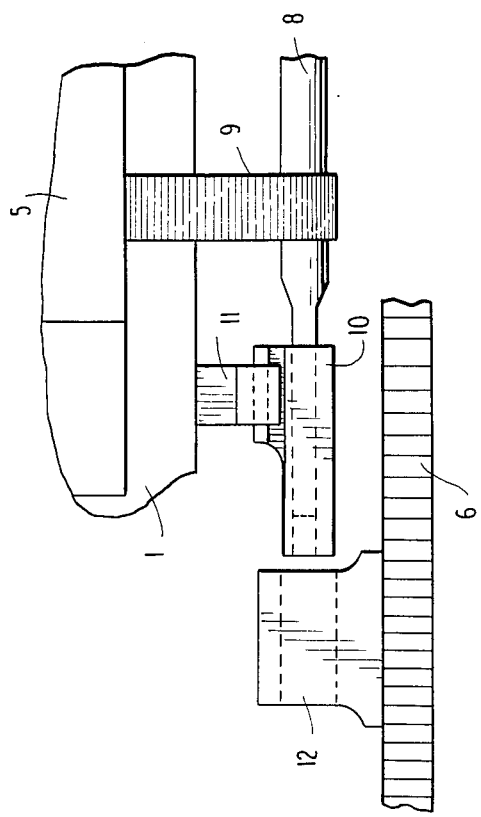
FIG. 3 is a partial, schematic view, on a larger scale, of the lower part of the door of FIGS. 1 and 2.

The ends of the control bar 8 are engaged in sliders 10, mobile in slides 11 fast with the door 1 (cf. FIGS. 3 and 4).

Opposite the ends of the control bar 8 are provided shoes 12 fixed to the floor 6.

The sliders 10 are controlled in translation by a handle 13, mounted on said door 1 and connected to said sliders by a complex mechanism of levers and connecting rods (not shown).

When the handle 13 occupies its position shown in solid lines in FIG. 1, said mechanism imposes on sliders 10 the position shown in FIGS. 3 and 4, for which they connect the bar 8 with door 1, via slides 11. Consequently, if, in this position of the handle 13, door 1 is opened, bar 8 cannot act on the rescue device which remains enclosed in its container 5.

On the other hand, when handle 13 occupies its position shown in broken lines in FIG. 1, the mechanism for actuating the sliders 10 oblige the latter to slide outwardly and penetrate in the fixed shoes and leave slides 11. Consequently, bar 8 is then fast with the floor 6, via said fixed shoes 12. If, in this position of handle 13, door 1 is opened, bar 8 cannot follow the movement thereof, with the result that it effects a traction on the laces 9 which release the rescue device contained in container 5.

As mentioned hereinbefore, such a known arrangement requires a complicated connecting mechanism (not shown) between the handle 13 and the sliders 10. Moreover, such an arrangement is sensitive to corrosion due to the movement of translation of said sliders.

It is an object of the mechanism according to the invention, illustrated in FIGS. 5 to 11, to remedy the drawbacks of this known arrangement.

Neither container 5 nor laces 9 have been shown in FIGS. 5, 6 and 7, for reasons of clarity. On the other hand, the other elements 1 to 4, 6 to 8 and 13 are found.

In the embodiment of the invention, illustrated in FIGS. 5 to 11, the control bar 8 is adapted to be connected in displacement with a mobile system constituted, on the one hand, by a horizontal shaft 14 mounted in the lower part of the door 1 in order to be able to rotate about its longitudinal axis X—X, and, on the other hand, by radial tabs 15 in mesh by their ends with said bar 8.

Between said handle 13 and the shaft 14, there is provided any known system for transforming the pivoting movement of the handle 13 into a movement of rotation of shaft 14. Such a system may for example comprise a rod 16 sliding parallel to itself under the action of a cam 17 connected to handle 13 and attacking shaft 14 via a crank 18.

The lower ends 19 of the radial tabs 15 are freely introduced at the top into recesses or openings 20 provided in the control bar 8.

It is thus seen that, by rotating handle 13, shaft 14 is made to rotate, with the result that the radial tabs 15 push or draw the control bar 8 to subject it to a movement of translation parallel to itself, of direction substantially at right angles to door 1.

Furthermore, at the ends of the threshold of door 1, there are provided shoes 21 fast with the floor 6. Each shoe 21 is provided with a hooking housing 22 open opposite the control bar 8 and capable of receiving one end thereof.

Telescopic fork elements 23, loaded by a spring 24, are mounted fast with door 1, opposite the shoes 21 and, when handle 13 is actuated, the bar 8 may pass from fork elements 23 to shoes 21, and vice versa.

Thus, when handle 13 is in its position shown in solid lines in FIG. 5, bar 8 is located in fork elements 23 and it is maintained fast with door 1, by said fork elements and by radial tabs 15. If, in this position, door 1 is opened, bar 8 follows the movement of opening thereof and does not act on the rescue device enclosed in container 5.

On the other hand, when handle 13 is in its position shown in broken lines in FIG. 5, bar 8 is located in shoes 21. If, in this position, door 1 is opened, the latter, on lifting, disengages tabs 14 from bar 8 and the latter remains fast with said shoes. It cannot follow the movement of opening of door 1 and therefore acts on the rescue device enclosed in container 5.

Shoes 21 are preferably closer to the outside of the aircraft than fork elements 23. The latter, upon opening of door 1, pass above said shoes thanks to the lift thereby undergone by said door.

As may be seen in FIGS. 9 to 11, shoes 21 are provided with bolts 25 preventing bar 8 from leaving the hooking housings 22 when it has penetrated therein and door 1 is opened. These bolts are formed by a simple tongue elastically pushed outwardly by a spring 26, in order to obturate the corresponding hooking housing 22 when door 1 is opened, the telescopic fork elements 23 pressing bolts 25 in retracted position to allow introduction of bar 8 under the action of handle 13, when door 1 is closed.

In order to be able to control bolts 25 as desired, the latter comprise a projecting catch 27. In this way, shoes 21 may be used for hooking a bar other than bar 8.

Thanks to the invention, a simple, reliable mechanism is obtained, enabling a rescue device enclosed in container 5 in door 1 to be automatically actuated.

What is claimed is:

1. Mechanism for automatically actuating a rescue device upon opening of a panel obturating an exit and bearing said rescue device and said mechanism, said panel undergoing a movement of lifting, or of rotation or of lifting combined with a rotation at the moment of opening, said mechanism comprising:
    a voluntary actuating member having a first and a second position;
    a control bar connected to said rescue device and substantially parallel to said panel;
    a movable assembly actuated by said actuating member, said movable assembly being releasably connected to said control bar and adapted to push or draw said control bar, so that said control bar can occupy a first end position remote to said panel when said actuating member is in its first position and a second and position near said panel when said actuating member is in its second position;
    fork elements freely supporting said control bar in its first end position;
    said mechanism being associated with hook elements fixed to the periphery of said opening and adapted to receive said control bar in its second end position, said control bar being transferred by said movable assembly from said fork elements to said hook elements when said voluntary actuating member moves from its first position to its second position.

2. The mechanism as claimed in claim 1 wherein said movable assembly comprises a rotating shaft having radial tabs, said radial tabs being disposed above said control bar and penetrating freely in notches provided in said control bar.

3. The mechanism as claimed in claim 1 wherein said hook elements are provided with bolts which prevent said control bar from leaving said hook elements after penetrating therein and the panel is open.

4. The mechanism as claimed in claim 3 wherein, when the panel is in closed position, said fork elements act on said bolts to retract them.

5. The mechanism as claimed in claim 1 wherein said fork elements are elastically telescopic.

6. The mechanism as claimed in claim 3 wherein said bolts are provided with members for the voluntary control of unlocking.

* * * * *